April 16, 1929. V. C. DE YBARRONDO 1,709,248
VEHICLE ADAPTED TO TRAVEL ON TRACK OR ROAD
Filed Nov. 26, 1927
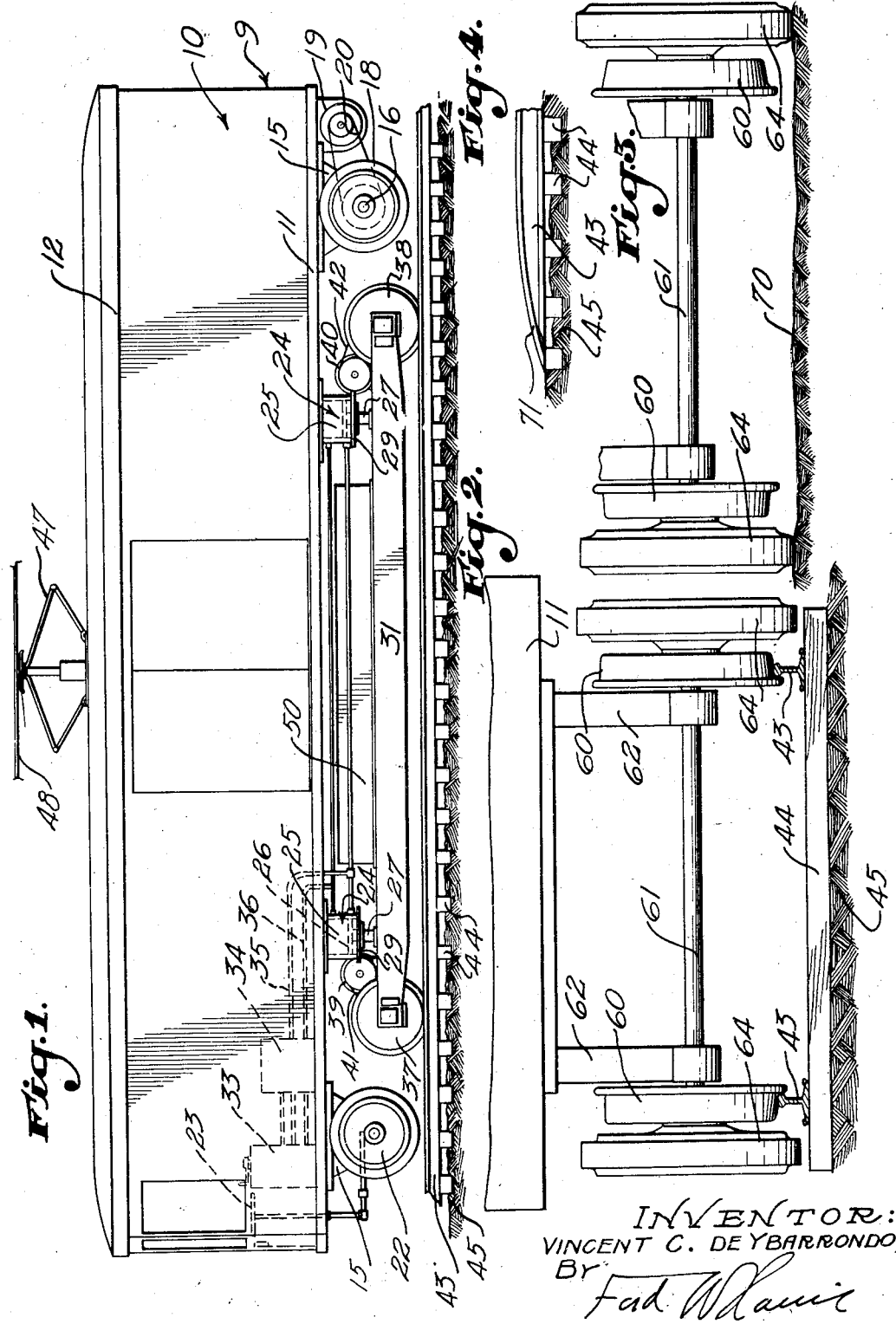

Patented Apr. 16, 1929.

1,709,248

UNITED STATES PATENT OFFICE.

VINCENT C. DE YBARRONDO, OF LOS ANGELES, CALIFORNIA, ASSIGNOR OF ONE-HALF TO WALTER L. KINCAID, OF SIERRA MADRE, CALIFORNIA.

VEHICLE ADAPTED TO TRAVEL ON TRACK OR ROAD.

Application filed November 26, 1927. Serial No. 235,822.

My invention relates to transportation vehicles and more particularly to a vehicle which will travel either on rails or on a road surface.

The field of activity of present day rail vehicles is limited owing to the fact that they can travel only where rails have been laid, and often have to transfer their load to other vehicles operating on the surface of roads before these loads reach their destination.

It is an object of my invention to provide a vehicle operable either on a track or on the surface of a road.

Another object of my invention is to provide such a device which may be conveniently steered when operating on the surface of a road.

Electrical rail lines are handicapped by being limited to operation where trolley wires or third rails have been installed. It would often be convenient to move a car operating on such electric lines over paths not equipped with means for supplying electrical energy to the car.

It is an object of my invention to provide a vehicle which may receive energy from a trolley wire along its path of travel or may travel by its own motor power.

I have found it desirable to install separate wheels on such a vehicle, one flanged for travel upon rails, and the other flat to engage the surface of a road. I have found it desirable to use either set of wheels, the other set at this time supporting no load. This is most conveniently accomplished by mounting the wheels on trucks which may be raised or lowered relative to the body of the vehicle.

It is an object of my invention to provide a vehicle having wheels for operating on rails, and wheels for operating on a road surface, either set of these wheels being adapted to individually support the weight of the vehicle.

I have found it advantageous to mount these sets of wheels on different trucks of the vehicle, these trucks being vertically movable relative to each other by means of jacks which are preferably hydraulically operated, these jacks being controlled from the interior of the car.

It is an object of my invention to provide a vehicle operable either on rails or a road surface, the body of the vehicle being supported on hydraulic jacks operating between the body and a wheel-retaining truck.

Further objects and advantages will be made evident hereinafter. Referring to the drawings:

Fig. 1 illustrates a side elevational view of the preferred form of my invention.

Fig. 2 illustrates a wheel arrangement of an alternative form of my invention when this wheel arrangement is operating on tracks.

Fig. 3 is a view similar to Fig. 2, showing a wheel arrangement of the alternative form of my invention operating on a road surface.

Fig. 4 is a view showing the track construction at a point where it is desired to transfer the alternative form of vehicle from rail operation to road operation.

Referring particularly to the drawings, I show a body 9 of a vehicle 10, this body having a platform 11 and a superstructure 12. The superstructure 12 comprises a suitable enclosure and may be designed for either passenger or freight service. Extending downward from each end of the vehicle 10 is a truck 15. The rear of the rear truck 15 journals a shaft 16 to which rear road wheels 18 are secured. These road wheels either have a flat surface or may be of the well known pneumatic type carrying suitable tires. The wheels 18 are driven by a motor 19 through a suitable power-transmitting connection indicated by the belt 20. The front truck 15 is adapted to mount front road wheels 22, these wheels being adapted to be turned by a steering wheel 23 to suitably steer the car when the car is travelling over a road surface.

Extending downward from the platform 11 is a pair of jacks 24 having hydraulic jack cylinders 25 in which pistons 26 are adapted to operate. The pistons 26 are connected to shafts 27 extending through plates 29 closing the lower end of each of the jack cylinders 25. Each of the shafts 27 is adapted to be connected to a central truck 31 extending over a considerable length of the vehicle 10, this central truck 31 being adapted to be raised and lowered by the operation of the hydraulic jacks 24. These hydraulic jacks are operated from a controller 33 situated inside of the vehicle 10, this controller being adapted to supply a fluid under pressure from a fluid-supply source 34 through either of a pair of control pipes 35 and 36 which communicate respectively with the lower and upper portions of each jack cylinder 25. By suitably manipulating the controller 33, the operator can force fluid under pressure through either of these control lines 35 and 36 and thus move the pistons 26 relative to the jack cylinders. The movement of the pistons is transferred to the central truck 31 so that the controller 33 determines the vertical position of the central truck 31.

Journalled in the ends of the central truck 31 are axles which carry pairs of flanged wheels 37 and 38. These pairs of flanged wheels are adapted to be driven by motors 39 and 40 through means indicated by belts 41 and 42 respectively. The flanged wheels 37 and 38 may be of standard construction as used on railroads, and are adapted to bear against rails 43 secured to ties 44 resting on the ground 45. The motors 19, 39, and 40 are adapted to be supplied with electrical energy derived either from a trolley 47 bearing against a trolley wire 48, or from a bank of storage batteries 50 carried by the vehicle 10. These storage batteries may be conveniently carried on the central truck 31, as shown in Fig. 1, although it is within the scope of my invention to place them anywhere on the vehicle 10. The controller 33 is adapted to supply electrical current to either the motor 19 or the motors 39 and 40, depending upon whether the car is operating upon the road surface or upon rails. The controller 33 is also adapted to contain suitable rheostats and control apparatus which will allow the batteries 50 to be charged directly from the trolley 47 when the car is operating in the vicinity of a trolley wire.

The operation of my invention is as follows:

Assuming that the central truck is in the position shown in Fig. 1, the vehicle 10 is adapted to be operated upon rails 43, the wheels 37 and 38 bearing against these rails and the road wheels 18 and 22 being in non-supporting position above the rails. At this time electrical energy may be supplied either through the trolley wire 48 or the batteries 50 to the motors 39 and 40. When it is desired to operate the car on the surface of a road, the controller 33 is operated to allow fluid under pressure to flow from the fluid-supply source 34 through the control pipe 35 and into the lower portion of the jack cylinder 25 below the piston 26 therein. Simultaneously the fluid pressure in the control pipe 36 is cut off so that as the fluid passes through the control pipe 35, the pistons 26 are raised relative to the cylinders 25, thus lowering the body 9 relative to the ground 45. This motion continues until the road wheels 18 and 22 come in contact with the road surface, at which time the weight of the vehicle 10 is carried by these wheels. It is preferable to continue this motion until the wheels 37 and 38 are raised a distance from the road surface so that there will be no danger of these wheels bearing against this surface. When the road wheels 18 and 22 are supporting the vehicle 10, it is possible to drive the vehicle in a manner similar to an automobile or truck. At this time the vehicle is steered by the steering apparatus 23, and energy may be supplied to the motor 19 either through the trolley wire 48 or from the batteries 50.

It should be understood that the positions of the road wheels and flanged wheels can be interchanged without departing from the spirit of my invention. Therefore, it is not necessary that one central truck 31 be used, inasmuch as it is equally feasible to use a series of trucks which are equipped with hydraulic jacks 24, these hydraulic jacks being adapted to simultaneously raise or lower the body relative to the trucks.

Figs. 2 to 4 inclusive show an alternative form of my invention where flanged wheels 60 are mounted on axles 61 carried by trucks 62 extending downward from the platform 11. Road wheels 64 having suitable tires thereon are also mounted directly on the axle 61 outside of the flanged wheels 60. The axle 61 may be suitably driven by a motor connected directly or indirecetly thereto, or may be in the form shown in the drawings where the axles 61 act merely as a support for the vehicle rather than a combined support and driving means. The diameter of the road wheels is slightly larger than the diameter of the flanged wheels 60, as clearly apparent from Figs. 2 and 3. Thus, when the flanged wheels 60 are engaging rails 43, the road wheels 64 will extend outside of the rails but will not bear against the ties 44 nor the ground 45. This condition is clearly shown in Fig. 2. Fig. 3 shows the road wheels engaging a road surface 70 and supporting the weight of the vehicle 10. At this time the flanged wheels 60 will not engage the surface of the road inasmuch as they are of a smaller diameter than the road wheels 64. When it is desired to transfer the vehicle from a track to a road, it is desirable to have the end of the track 43 formed as shown in Fig. 4, so that the upper flange 71 thereof will dip downward to meet the ground 45. With this arrangement the car can be very easily transferred from road operation to track operation.

The form of my invention, as shown in Figs. 2, 3, and 4, has the added advantage that no jacks 24 are required to raise and lower the body of the vehicle 10. Suitable switches in the rails 43 would have to be designed so as to allow a passage of the road wheels 64 through a portion of the rails 43 when the vehicle is being switched from a main track to a branch track.

I claim as my invention:

1. In a device capable of travelling on rails or on a road, the combination of: a body; trucks extending below said body; flanged wheels journalled in certain of said trucks; road wheels journalled in other of said trucks; and fluid means for relatively raising said trucks journalling said flanged wheels and said trucks journalling said road wheels.

2. In a device capable of travelling on rails or on a road, the combination of: a body; trucks extending below said body; flanged wheels journalled in certain of said trucks; road wheels journalled in other of said trucks; and fluid means for vertically moving said trucks journalling said flanged wheels relative to said trucks journalling said road wheels.

3. In a device capable of travelling on rails or on a road, the combination of: a body; trucks extending below said body; flanged wheels journalled in certain of said trucks; road wheels journalled in other of said trucks; means for relatively raising said trucks journalling said flanged wheels and said trucks journalling said road wheels; and means for separately driving said flanged and said road wheels.

4. In a device capable of travelling on rails or on a road, the combination of: a body; trucks extending below said body; flanged wheels journalled in certain of said trucks; road wheels journalled in other of said trucks; fluid means for relatively raising said trucks journalling said flanged wheels and said trucks journalling said road wheels; and steering means connected to said road wheels.

5. In a device capable of travelling on rails or on a road, the combination of: a body; trucks extending below said body; flanged wheels journalled in certain of said trucks; road wheels journalled in other of said trucks; means for relatively raising said trucks journalling said flanged wheels and said trucks journalling said road wheels; means for separately driving said flanged and said road wheels; and steering means connected to said road wheels.

6. In a device capable of travelling on rails or on a road, the combination of: a body; trucks extending below said body; flanged wheels journalled in certain of said trucks; road wheels journalled in other of said trucks; and hydraulic jacks relatively raising said trucks journalling said flanged wheels and said trucks journalling said road wheels.

7. In a device capable of travelling on rails or on a road, the combination of: a body; trucks extending below said body; flanged wheels journalled in certain of said trucks; road wheels journalled in other of said trucks; means for relatively raising said trucks journalling said flanged wheels and said trucks journalling said road wheels; a trolley adapted to receive energy from a trolley wire when said device is operating on said rails; and a storage battery adapted to drive said device when the energy from said trolley wire is not available.

8. In a device capable of travelling on rails or on a road, the combination of: a body; trucks mounted fore and aft of said body; road wheels journalled in said fore and aft trucks; a central truck; hydraulic jacks connecting said central truck to said body; means for operating said jacks; flanged wheels journalled in said central truck; and means for driving said flanged and said road wheels.

9. In a device capable of travelling on rails or on a road, the combination of: a body; trucks extending below said body; flanged wheels journalled in certain of said trucks; road wheels journalled in the other of said trucks; means for selectively raising said trucks journalling said flanged wheels and said trucks journalling said road wheels; and means for separately driving said flanged and said road wheels.

10. In a device capable of travelling on rails or on a road, the combination of: a body; trucks connected to the ends of said body; road wheels journalled in said trucks; auxiliary trucks disposed between said end trucks; flanged wheels journalled in said auxiliary trucks; means for relatively raising said auxiliary trucks; and means for separately driving said flanged and said road wheels.

11. In a device capable of travelling on rails or on a road; the combination of: a body; trucks connected to the ends of said body; road wheels journalled in said trucks; auxiliary trucks disposed between said end trucks; flanged wheels journalled in said auxiliary trucks; suspension means for said auxiliary trucks; means for relatively raising said auxiliary trucks; and means for separately driving said flanged and said road wheels.

12. In a device capable of travelling on rails or on a road, the combination of: a body; trucks connected to and extending below the ends of said body; road wheels journalled in said trucks; trucks suspended from said body intermediate said end trucks; flanged wheels journalled in said intermediate trucks; suspension means for said intermediate trucks; means for relatively raising said trucks journalling said flanged wheels and said trucks journalling said road wheels; and means for separately driving said flanged and road wheels.

13. In a device capable of travelling on rails or on a road, the combination of: a body; trucks connected to and extending below the ends of said body; road wheels journalled in said trucks; trucks suspended from said body intermediate said end trucks; flanged wheels journalled in said intermediate trucks; fluid suspension means for said intermediate trucks; means for relatively raising said trucks journalling said flanged wheels and said trucks journalling said road wheels; and means for separately driving said flanged and road wheels.

14. In a device capable of travelling on rails or on a road, the combination of: a body; trucks connected to and extending below the ends of said body; road wheels journalled in said trucks; trucks suspended from said body intermediate said end trucks; flanged wheels journalled in said intermediate trucks; suspension means for said intermediate trucks; fluid means for relatively raising said trucks journalling said flanged wheels and said trucks journalling said road wheels; and means for separately driving said flanged and road wheels.

15. In a device capable of travelling on rails or on a road, the combination of: a body; trucks connected to and extending below the ends of said body; road wheels journalled on said end trucks; auxiliary trucks adjustably mounted on said body between said end trucks; flanged wheels journalled on said auxiliary trucks; means for relatively elevating said auxiliary trucks; means for separately driving said road and flanged wheels; and steering means connected to said road wheels.

In testimony whereof, I have hereunto set my hand at Los Angeles, California, this 21st day of November, 1927.

VINCENT C. DE YBARRONDO.